UNITED STATES PATENT OFFICE.

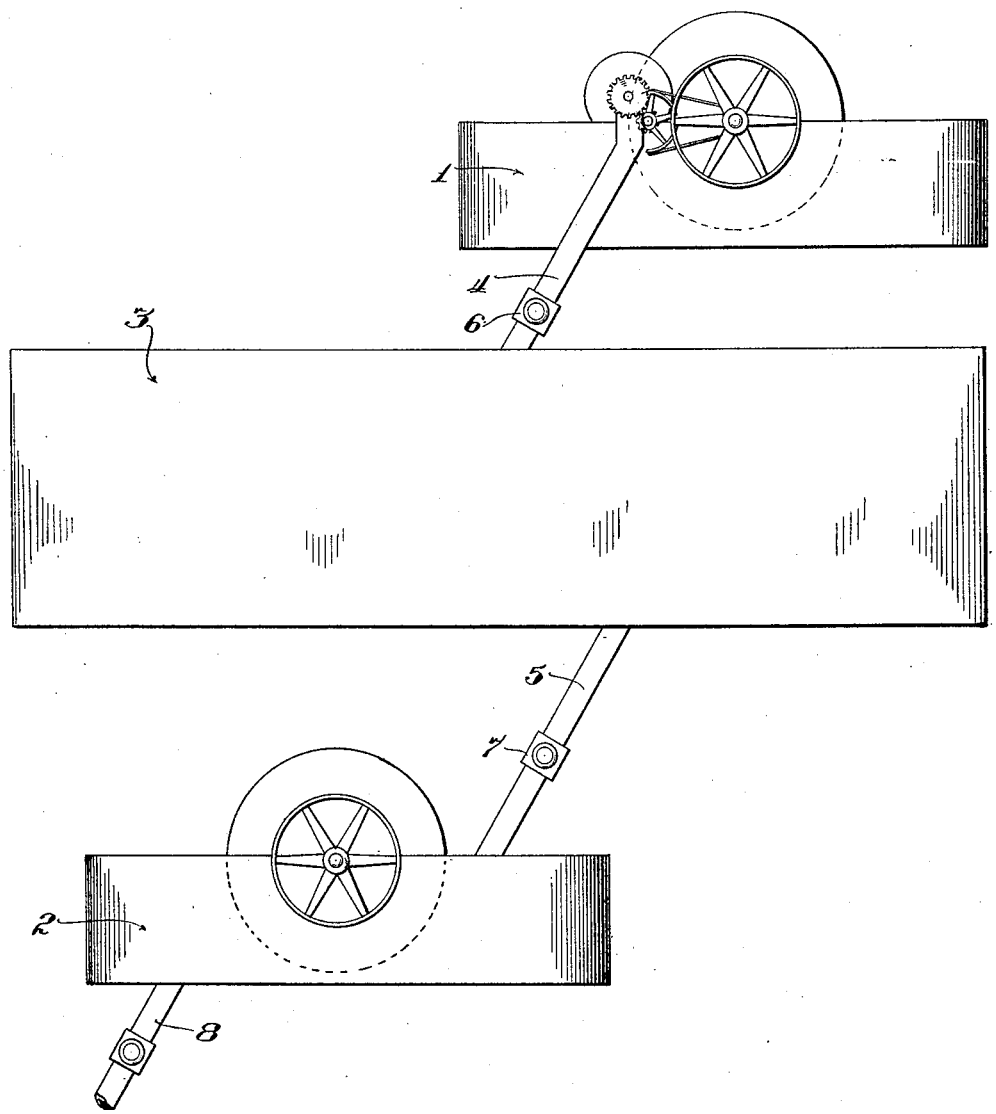

JAMES T. MURPHY AND EDWARD J. RANEY, OF CHICAGO, ILLINOIS, ASSIGNORS TO JAMES L. CAREY, OF CHICAGO, ILLINOIS.

APPARATUS FOR MAKING PAPER.

1,318,900.      Specification of Letters Patent.      Patented Oct. 14, 1919.

Application filed January 30, 1919. Serial No. 273,954.

*To all whom it may concern:*

Be it known that we, JAMES T. MURPHY and EDWARD J. RANEY, citizens of the United States, and residents of Chicago, in the county of Cook and State of Illinois, have invented certain new and useful Improvements in Apparatus for Making Paper, of which the following is a full, clear, concise, and exact description, reference being had to the accompanying drawings, forming a part of this specification.

Our invention relates to improvements in apparatus for making paper, and is especially concerned with the manufacture of paper formed from a composite stock; that is, a stock which is itself a mixture of two or more different grades of stock.

Certain grades of paper are made from a mixture of two or more grades or kinds of paper stock, and it is usually the case that one of these grades or kinds of stock forms by far the greater percentage of the stock used in making those particular kinds of paper. In making papers of these kinds it has heretofore been the practice to use two beating engines, one of which produces the stock which forms the greater percentage of the composite stock, and the other of which merely mixes this stock with the other stock or stocks forming the smaller percentage of the composite stock. In operating a mill of this type the first beater is run until it is filled with formed stock which is then transferred to the mixing beater, where the additional stock or stocks forming the smaller percentage of the composite stock are added. The mixing beater then mixes these stocks and delivers them to a suitable stuff chest.

From this description of the apparatus at present in use it will be apparent that the beating engine which supplies the greater portion of the stock for the composite stock is alternately filled and emptied. In other words, it is intermittently operated. During recent years beating engines have been used which operate continuously; that is, the material for forming the stock and the water are supplied thereto substantially continuously and the formed stock is continuously removed from the beating engine. This type of engine operates more efficiently and produces a stock of more constant consistency than it is possible to produce with the intermittently operating beating engines; and it is one of the objects of our invention to provide apparatus for making composite stock which will make possible the use of a continuously operated beating engine for supplying the stock which forms the major portion of the composite stock.

Other objects of our invention are:

First: To provide novel means for forming composite paper stock;

Second: To provide means of this character which will permit the use of a continuously operating beating engine for producing the stock which forms the greater percentage of the composite stock;

Third: To provide a novel process or method of forming composite paper stock; and Fourth: To effect economies in the manufacture of composite paper stock.

Other objects will appear as this description progresses, reference being had to the accompanying drawing, which shows in a diagrammatical manner the novel apparatus which we have invented, and by means of which we carry out our novel process.

In this drawing the reference character 1 indicates the tank of a beating engine, which is illustrated as being of the continuous type, such as that disclosed in our co-pending application Serial No. 274,192, filed January 31st, 1919. Any other type of continuously operating beating engine may, however, be employed as a part of our novel apparatus and for carrying out our process. The reference character 2 indicates the tank of a second beating engine located at a lower level than the first-mentioned beating engine, and which is herein illustrated as being of the type which is intermittently operated. The reference character 3 indicates a stuff chest which is located at a level intermediate the levels of the two beating engines, and which preferably has a capacity about four times as great as that of the lower beating engine. A suitable conveying conduit 4 is shown for conveying the stock from the upper beating engine and discharging it into the stuff chest 3, and a second conveying conduit 5 is shown for conveying the stock from the stuff chest 3 to the beating engine 2. These conduits may be of any desired type, but are illustrated as being ordinary pipe conduits respectively provided with valves 6 and 7 for controlling the passage of stock therethrough.

In the operation of our improved apparatus the proper materials for producing the stock which is to form the greater percentage of the composite stock are continuously introduced into the upper beating engine, and the formed stock is continuously discharged through the conduit 4 into the stuff chest 3. A sufficient quantity of the stock in the stuff chest 3 is drawn off through the conduit 5 into the lower beating engine and the other stock or stocks forming the smaller percentage of the composite stock are introduced into this beating engine. This engine is then operated to thoroughly mix these stocks, which are then discharged through the conduit 8 into a second stuff chest or any other suitable receptacle.

By providing the stuff chest 3 the upper beating engine can operate continuously and it is therefore unnecessary to interrupt its operation to await an opportunity to discharge its contents into the lower beating engine.

Heretofore where the stock has been transmitted directly from the first beating engine to the mixing engine, it has required several beating engines to supply the stock to the mixing engine, this being due to the fact that considerable time is required in emptying and starting a beater which operates upon the intermittent plan. With our improved apparatus a single beating engine will provide an ample supply of stock to the mixing engine, and thus not only is the investment in apparatus materially decreased, but the amount of labor required to operate the apparatus is correspondingly reduced, with a corresponding resulting decrease in the cost of manufacturing the paper.

While our apparatus is of particular utility where the upper beating engine is of the continuously operating type and the lower engine is of the intermittently operating type, it is not to be limited to engines of this type occupying these respective positions, for it possesses a certain amount of utility where the upper beating engine is of the intermittently operating type, for the reason that the operation of this upper engine is not dependent in any way upon the operation of the lower engine; that is, it need not await the emptying of the lower engine but may form successive batches of the stock and discharge them into the stuff chest as fast as they are formed. Furthermore, a continuously operating engine can be substituted for the lower mixing engine described above, the chief purpose in using an intermittently operating engine being to more easily regulate the consistency of the composite stock.

While we have described our apparatus as embodying one beating engine located at a higher level than the other, and a stuff chest located at a level intermediate these two engines, we wish it to be clearly understood that our invention is not limited to one in which these elements are thus located. Both engines may be located upon the same or different levels, and the stuff chest may be on the same level as the beating engines, or may be placed at a different level. The important feature of our invention is the locating of a receptacle intermediate the engine which produces the greater percentage of the stock and the mixing engine, for receiving the stock from the first-mentioned engine and delivering it to the second engine. The character of the means for conveying the stock from the beating engine to the stuff chest and from the stuff chest to the mixing engine is not important. Any suitable type of conveyer may be used for this purpose. Furthermore, our invention is not limited in any way to the use of a particular type of beating engine.

Under some circumstances it may happen that the stuff chest 3 will become completely filled with stock, so that any further addition thereto would cause the stock in said stuff chest to overflow. While this is not likely to occur, overflowing of the stuff chest can be prevented by merely lifting the beater roll or the discharging cylinder of the upper beating engines, or both, in a manner well known to those skilled in this art.

While we have described the details of the preferred embodiment of our invention, our invention is not to be limited in any way to these details, except as may be necessary by the scope of the appended claims.

Having thus described our invention, what we claim is:

1. Means for making paper stock, comprising an intermittently operating beating engine, a continuously operating beating engine positioned at a higher level than said intermittently operating engine, a stuff chest located at a level intermediate said engines, and having a capacity greater than said first-named engine, means for conveying stock from said first-named engine to said stuff chest and from said stuff chest to said last-named engine.

2. The combination with a continuously operating beating engine, and an intermittently operating beating engine, of a stuff chest having a capacity greater than said intermittently operating engine, means for conveying stock from said continuously operating engine to said stuff chest, and means for conveying stock from said stuff chest to said intermittently operating engine.

3. The combination with a beating engine, of an intermittently operating beating engine lying at a lower level, a stuff chest having a larger capacity than said last-named engine lying at a level intermediate said engines, means for conveying stock from said first-named engine to said stuff chest, and from said stuff chest to said last-named engine.

4. The combination with means for mixing a plurality of different paper stocks, of means for forming one of said stocks, and means intermediate said mixing and forming means for storing the stock produced by said forming means, the said storing means having a capacity greater than that of said mixing means.

In witness whereof we hereunto subscribe our names this 18th day of January, 1919.

JAMES T. MURPHY.
EDWARD J. RANEY.

Witnesses:
W. C. KAISER,
EARL F. PIERCE.

Copies of this patent may be obtained for five cents each, by addressing the "Commissioner of Patents, Washington, D. C."

It is hereby certified that Letters Patent No. 1,318,900, granted October 14, 1919, upon the application of James T. Murphy and Edward J. Raney, of Chicago, Illinois, for an improvement in "Apparatus for Making Paper," were erroneously issued to James L. Carey, as assignee of the entire interest in said invention, whereas said Letters Patent should have been issued to the *inventors, said Murphy and Raney, and said James L. Carey, jointly*, said Carey being owner of *one-third* interest only in said invention, as shown by the record of assignments in this office; and that the said Letters Patent should be read with this correction therein that the same may conform to the record of the case in the Patent Office.

Signed and sealed this 18th day of November, A. D., 1919.

[SEAL.]

M. H. COULSTON,
*Acting Commissioner of Patents.*

Cl. 92—22.